United States Patent
Ishida

(10) Patent No.: US 6,225,440 B1
(45) Date of Patent: May 1, 2001

(54) CATIONIC RING-OPENING POLYMERIZATION OF BENZOXAZINES

(75) Inventor: Hatsuo Ishida, Shaker Heights, OH (US)

(73) Assignee: Edison Polymer Innovation Corporation, Akron, OH (US)

( * ) Notice: Subject to any disclaimer, the term of this patent is extended or adjusted under 35 U.S.C. 154(b) by 0 days.

(21) Appl. No.: 09/105,859

(22) Filed: Jun. 26, 1998

(51) Int. Cl.$^7$ .................................................. C08G 59/18
(52) U.S. Cl. .............................. 528/403; 544/90
(58) Field of Search ............................... 528/403; 544/90

(56) References Cited

U.S. PATENT DOCUMENTS

| | | | | |
|---|---|---|---|---|
| 5,152,939 | * | 10/1992 | Ishida | 264/29.1 |
| 5,543,516 | * | 8/1996 | Ishida | 544/69 |
| 5,900,447 | * | 4/1999 | Ishida | 524/404 |

FOREIGN PATENT DOCUMENTS

1164331 * 9/1969 (GB) .

OTHER PUBLICATIONS

European Search Report for Application PCT/US99/13840, Jul. 1999.*

Miyamoto et al., *Kobunshi Ronbunshu*, p. 536–545, 1995.*

Hackh's Chemical Dictionary, p. 91, 1969.*

Print out of Benzoxazine Entry in Registry File of Chemical Abstracts, 1999.*

* cited by examiner

*Primary Examiner*—Robert Dawson
*Assistant Examiner*—D. Aylward
(74) *Attorney, Agent, or Firm*—Hudak & Shunk Co., L.P.A.

(57) ABSTRACT

Cationic polymerization of mono and polyfunctional benzoxazine monomers is described. The chemical structure of the polymers from cationic polymerization of benzoxazine monomers has been identified and distinguished from thermally polymerized products from the same monomers. The controllable microstructure of the polymers from benzoxazines prepared by cationic polymerization offers opportunities to prepare and optimize the polymer structure for specific applications.

20 Claims, No Drawings

CATIONIC RING-OPENING POLYMERIZATION OF BENZOXAZINES

FIELD OF INVENTION

Benzoxazine monomers can be formed from the reaction of a phenolic compound, an aldehyde (desirably formaldehyde), and a primary amine. Cationic initiator are disclosed herein for polymerizing benzoxazines. The resulting polymers have higher char yields than conventionally (thermally) polymerized benzoxazines. The polymer structure, as determined by NMR, FTIR and molecular weight distribution of the polymer, is also different than conventionally (thermally) polymerized benzoxazine.

BACKGROUND OF THE INVENTION

Polymers derived from the ring opening polymerization of benzoxazine compounds compete with phenolic, epoxy, and other thermoset or thermoplastic resins in various applications. Benzoxazines can be used as a precursor for chars used in applications where high thermal stability is required such as aircraft disc brakes and thermal insulators.

Benzoxazines have advantages over conventional thermoset resins as the benzoxazine can be readily molded from the melt and then polymerized without releasing substantial amounts of polymerization reaction by-products.

The mechanism of thermally induced ring opening polymerization of benzoxazines is not sufficiently understood to provide control over the molecular weight distribution and branching of the polymer. It is anticipated that the performance of benzoxazine polymers in terms of modulus, processability, and char yield on heating could be improved by controlling the microstructure (branching and molecular weight). Current thermally induced polymerization processes offer little or no opportunity to better understand or control the factors that determine branching, polymer molecular weight, etc. Attempts to use initiators and/or catalysts to polymerize benzoxazine monomers in the past have only slightly modified (shifted) the exotherm temperature of the polymerization.

SUMMARY OF INVENTION

Cationic polymerization initiators have been found to be effective in initiating ring opening polymerizations of benzoxazine monomers. These initiators allow the polymerization of benzoxazine monomers as low as $-60°$ C. rather than the traditional $150-300°$ C. for thermal polymerization. The polymers from these cationically initiated polymerizations have controllable and different structures as noted by the different infrared spectrum, different NMR spectrum, and different molecular weight distributions as compared to thermally polymerized polymers from benzoxazines. It is anticipated that little or no volatiles will be released from these cationic polymerizations. Further as in thermally initiated ring opening polymerizations of benzoxazines, it is anticipated that little shrinkage of the benzoxazine compositions will occur during polymerization. These cationic polymerizations hold promise for processes where the benzoxazine monomers are molded or shaped into articles and then polymerized into thermoplastics or thermosets or polymerized into thermoplastic polymers and molded or shaped and optionally crosslinked. Although the initial experiments were run on monofunctional and difunctional monomers, it is understood that polyfunctional monomers can be used to yield branched or crosslinked polymers.

The conventional thermally polymerized benzoxazine based on bisphenol-A, formaldehyde, and aniline has char yields by TGA at $800°$ C. of about 30 weight percent Unexpectedly, the polymers from the cationically initiated polymerization of the same benzoxazine can have char yields at $800°$ C. by thermogravimetric analysis (TGA) of 43, 49 or 50 weight percent to 62 weight percent or higher.

DETAILED DESCRIPTION OF THE INVENTION

The benzoxazine monomers readily polymerized by the cationic initiator disclosed later are monobenzoxazine and polybenzoxazine compounds generally having the general formula Formula A wherein n can be any integer from 1 to 20 and is preferably an integer from 1 to 4 and is most preferably 1 or 2 and $R_1$ can be hydrogen, one or more groups selected from hydroxyls, one or more linear or branched alkyls of 1 to 80 and more preferably 1 to 10 carbon atoms, aromatics, alkyl substituted aromatics, aromatic substituted alkyls of 6 or 20 carbon atoms, mono or poly fluorine substituted alkyls of 1 to 20 carbon atoms, mono or poly fluorine substituted compound having at least 1 aromatic ring and 6 to 20 carbon atoms, and phenolic compounds of 6 to 20 carbon atoms (for the purpose of this specification phenolic compounds may have more than one hydroxyl group as defined in chemical dictionaries) including poly phenolic compounds having on average 6 to 20 carbon atoms per phenol group. When n is 2, 3 or 4, $R_1$ can be selected from the connecting groups below

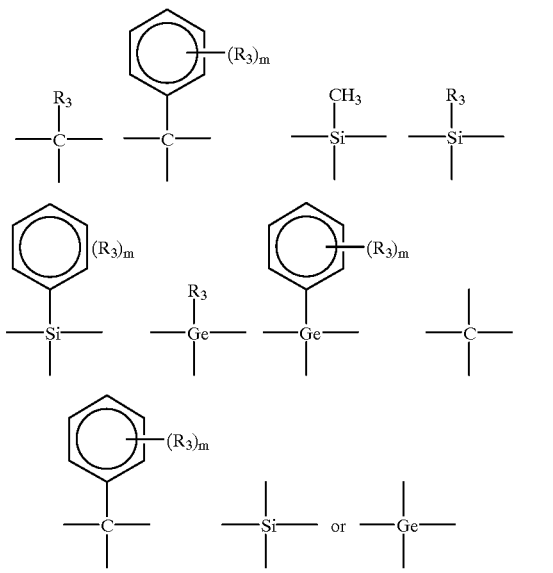

Depending on whether phenolic or phenoxy repeat units are desired in said polybenzoxazine, it may be desirable that $R_1$ be ortho, meta or para to the oxygen atom of the benzoxazine monomer of Formula A. Further $R_2$ may be an alkyl of 1 to 40 carbon atoms, an aromatic, an alkyl substituted aromatic or aromatic substituted alkyl of 6 to 40 carbon atoms, mono or poly fluorine substituted alkyl of 1 to 20 carbon atoms, a mono or poly fluorine substituted compound having at least one aromatic ring and 6 to 20 carbon atoms or an amine of 1 to 40 carbon atoms including polyamines and aromatic, alkyl substituted aromatic, or aromatics substituted alkyls having 6 to 40 carbon atoms. Furthermore, each benzene ring, as shown by $(R_3)$, where p is an integer from 0 to 3 and $R_3$ is as defined later, can have more than one substituent of the same structure or a mixture of the $R_3$ structures.

The variable m can be an integer from 0 to 5 and $R_3$ can be H or $R_2$. Preferably $R_3$ is not the amine or polyamine components of $R_2$. Preferably $R_3$ is an alkyl of 1 to 9 carbon atoms such as $CH_3$, $C_2H_5$, $C_3H_7$ or $C_4H_9$, or a mono or poly fluorinated alkyl of 1 to 9 carbon atoms such as $CF_3$, $C_2F_5$, $C_3F_7$. These $R_1$ compounds are well known to those familiar with phenolic compounds. Generally $R_1$ can be any of the known connecting groups than interconnect two or more phenols. Known connecting groups refers to those which are present in commercially available phenols, are in experimentally available phenols, and phenols whose synthesis are described in the published literature. Examples of such phenols include

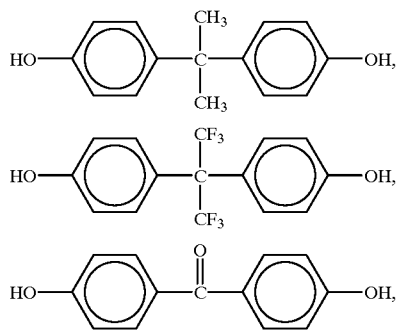

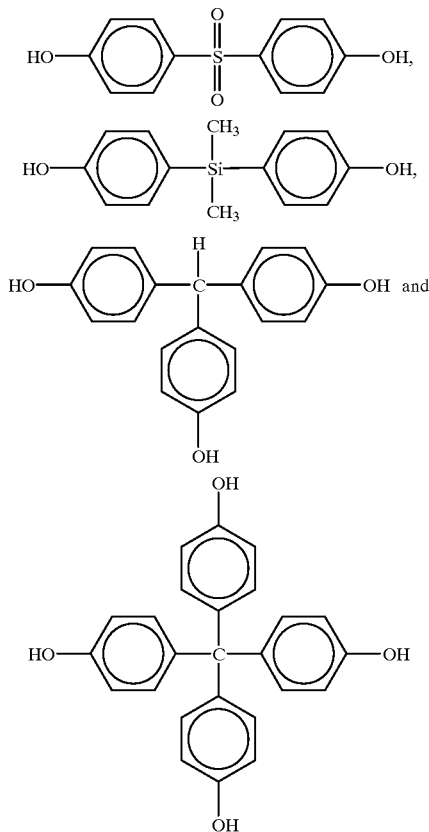

As the cationically initiated ring opening polymerization of monofunctional benzoxazines generally results in linear polymers, it is desirable that at least 25 mole percent, more desirably at least 50 mole percent and preferably at least 75 mole percent or 90 mole percent of the $R_1$ groups are not an additional hydroxyl groups or a phenolic or polyphenolic compound and n in Formula A is 1. Also desirably at least 25 mole percent, more desirably at least 50 percent, still more desirably at least 75 or 90 mole percent of the $R_2$ groups are neither polyamines nor include additional benzoxazine compounds. These limitations are desirable for thermoplastic polybenzoxazines but it is understood that if thermoset polybenzoxazines are desired the amount of difunctional or polyfunctional benzoxazine monomers (those where n is 2 to 20 or $R_2$ is a polyamine or includes additional benzoxazine rings) could be higher. When high molecular weight thermoplastic polybenzoxazines are desired, desirably the number average molecular weight of said polybenzoxazine is at least 5,000 and more desirably at least 10,000.

As is well known, benzoxazine monomers are made from the reaction of three reactants, aldehydes, phenols, and primary amines by procedures using a solvent or known as solventless systems. U.S. Pat. No. 5,543,516, hereby incorporated by reference, sets forth a generally solventless method of forming benzoxazine monomers. An article by Ning and Ishida in Journal of Polymer Science, Chemistry Edition, vol. 32, page 1121 (1994) sets forth a procedure using a solvent which can be used to prepare benzoxazine monomers. The procedure using solvents is generally common to the literature of benzoxazine monomers.

The preferred phenolic compounds are phenol or cresol but can include diphenols (e.g. bisphenol-A), triphenols, etc., e.g. polyphenols, wherein each phenolic group in the phenolic compound has on average about 6 to about 20 carbon atoms per phenol group. The use of phenols with two or more hydroxyl groups reactive in forming benzoxazines may result in branched and/or crosslinked products. The groups connecting said phenolic groups into a phenol can be branch points or connecting groups in the polybenzoxazine.

The aldehydes used to form the benzoxazine can be any aldehyde but preferably the aldehydes are those having from about 1 to about 10 carbon atoms with formaldehyde being highly preferred. The amine used to form the benzoxazine can be an aromatic amine aliphatic amine, alkyl substituted aromatic or aromatic substituted alkyl amine. The amine can also be a polyamine, although the use of polyamines will, under some circumstances, yield polyfunctional benzoxazine monomers. Polyfunctional benzoxazine monomers are more likely to result in branched and/or crosslinked polybenzoxazines than monofunctional benzoxazines, which would be anticipated to yield thermoplastic polybenzoxazines.

The amines generally have from about 1 to abut 40 carbon atoms unless they include aromatic rings and then the may have from about 6 to about 40 carbon atoms. The amine of di or polyfunctional may also serve as a branch point to connect one polybenzoxazine to another.

In the past, thermal polymerization has been the preferred method for polymerizing benzoxazine monomers. The temperature to induce thermal polymerization is typically varied from about 150 to about 300° C. The polymerization is typically done in bulk but could be done from solution or otherwise. Catalyst, such as carboxylic acids, have been known to slightly lower the polymerization temperature or accelerate the polymerization rate at the same temperature.

Cationic polymerization initiators described in this invention have been found to result in polymerization of benzoxazine monomers at temperatures as low as cryogenic temperatures. Preferred temperatures are from about –100° C. to about 200° C. and m-ost preferably between about –60 and 150° C. for ease of handling the reactants and products. Some of the cationic initiators, e.g. $PCl_5$, form repeating units, from the benzoxazine monomers, that include a salt of the amine. These repeating units have better solubility in polar solvents, e.g. water than similar repeating units without the amine salt. The initiators of the current invention can be used either in the benzoxazine melt or in the presence of solvent, allowing the solvent content to be from 0% to nearly 100%. Many solvents can be used in cationic polymerizations and its selection is known by those skilled in the art of cationic polymerization.

The polymers from the cationically initiated polymerization of benzoxazine are useful as molded articles with good thermal stability and/or flame resistance such as molded circuit boards, flame resistant laminates, other molded articles and is a source of precursor to high temperature resistant chars. The common uses for high temperature resistant chars include aircraft brake discs, equipment for sintering reactions, and heat shields or heat shielding material. The polymers which include repeating units having amine salts can be used in applications for partially or fully water soluble polymers such as viscosity control agents.

Generally given optimal reaction conditions, cationic initiators can polymerize benzoxazine monomers or oligomers. These include $H_2SO_4$, $HClO_4$, $BF_3$, $AlCl_3$, t-BuCl/$Et_2AlCl$, $Cl_2/BCl_3$, $AlBr_3$, $AlBr_3 \cdot TiCl_4$, $I_2$, $SnCl_4$, $WCl_6$, $AlEt_2Cl$, $PF_5$, $VCl_4$, $AlEtCl_2$, and $BF_3 Et_2O$. Preferred initiators include $PCl_5$, $PCl_3$, $POCl_3$, $TiCl_5$, $SbCl_5$, $(C_6H_5)_3C^+$ $(SbCl_6)^-$, metallophorphyrin compounds such as aluminum phthalocyanine chloride which are all known to result in similar polymers from cationically initiated polymerization of unsaturated monomers. Methyl iodide (a covalent initiator), butyl lithium (an ionic initiator), and benzoyl peroxide (a radical initiator) were not effective at polymerizing experimental benzoxazine monomers.

Methyl tosylate, methyl triflate and triflic acid appear to cationically polymerize the experimental benzoxazine monomers, although the polymers did not precipitate from solution. Typically each initiator initiates a polymer with from about 3 to about 1,000 to 3,000 repeat units so the amount of initiator needed on a mole percent basis relative to the monomer is small. However, additional initiator is needed to compensate for loss due to adventitious moisture and other reactants that deactivate cations, that may be present in the monomers solvents, etc. Desirably about 0.001 to about 50 mole percent initiator based upon the monomer and more desirably from about 0.01 to about 10 mole percent initiator is used for these cationically initiated polymerizations.

EXAMPLES

Several factors have been found to change the structure of the benzoxazine polymers prepared by cationic polymerization. These factors include polymerization temperature, the particular cationic initiator and competing reactivity between the ortho-carbon of the benzene ring and the basic nitrogen atom of the oxazine ring.

For example the following results were obtained with $PCl_5$ as the initiator at –60° C. and 40° C.

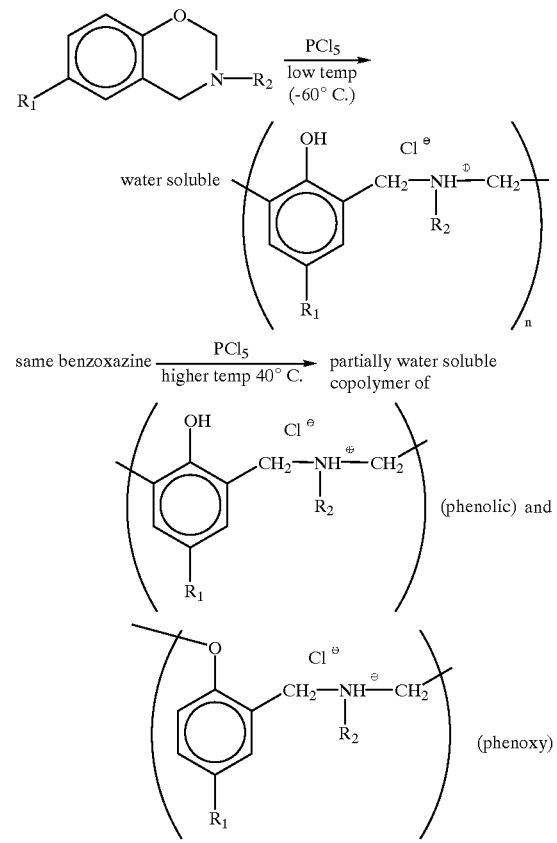

Thus the formation of a phenolic repeating) unit having an amine salt therein occurs preferentially to this kind of monomer (monoparasubstituted benzene ring other than the two sites occupied by the oxazine ring) at low temperatures (e.g. −60° C.) with a PCl₅ initiator. A phenoxy repeating unit occurs more frequently at 40° C. than at −60° C. but still is not the exclusive repeating unit. The amine salt form of the phenolic repeating unit causes an increased water solubility. further at −60° C. the availability or reactivity of a ortho CH position also affects the relative ratio of phenolic to phenoxy repeat units. Steric hindrance around the ortho CH position or a substituent in the ortho Cl position favors a phenoxy structure from the benzoxazine while the absence of steric hindrance and absence of an ortho substituent favors a phenolic structure. A unified theory to explain the above is that there is a competition between the reactivity of the aromatic carbon (ortho with respect to the oxygen) and the basic nitrogen atom of the (O—$CH_2$—N($R_2$)$CH_2$). When substitution on the aromatic ring is in such a way that it reduces the reactivity of the ring ortho carbon, the protonation or alkylation of the nitrogen dominates and a phenoxy structure results. However, if the ortho CH position (with respect to the O) is open and no bulky substituent offers steric hindrance., the ring reactivity dominates and a phenolic structure at low temperatures is the result. In summary it is anticipated that at −60° C. if i) Aromatic ring reactivity dominates then a phenolic repeating structure is obtained and if ii) oxazine ring reactivity dominates then a phenoxy repeating structure is obtained and that monomers given below will result in an increased probability of the repeating structures given.

| Monomer | Preferred Repeating Structure |
|---|---|
| (R₁ on ring, O, N–R₂) | Phenolic structure |
| (R₁ on ring, O, N–R₂) | Phenoxy structure |
| (R₁, R₁ on ring, O, N–R₂) | Phenoxy structure |
| (R₁, R₁, R₁ on ring, O, N–R₂) | Mixture phenolic and phenoxy |

As phenolic repeat units from benzoxazine are now available from lower temperature cationic polymerizations, it is desirable to distinguish the resulting polymer from thermally polymerized benzoxazine polymers. Desirably the number average molecular weight of polymers from cationi cally polymerized monofunctional benzoxazine monomers are at least 2,000 or 5,000. Desirably the cationically polymerized benzoxazine when both phenolic and phenoxy structures result has at least 2, 5, 10 or 15 or at least 50, 80, or 90 mole % repeating units of the phenoxy structures. However, the pure phenolic structure when the molecular weight is above 2,000 or 5,000 is not excluded.

Five benzoxazine monomers were used for most of the experimentation on cationically initiated polymerization. They were BA-a monomer and C-m monomer. Different chemical structures for two of the monomers are shown below.

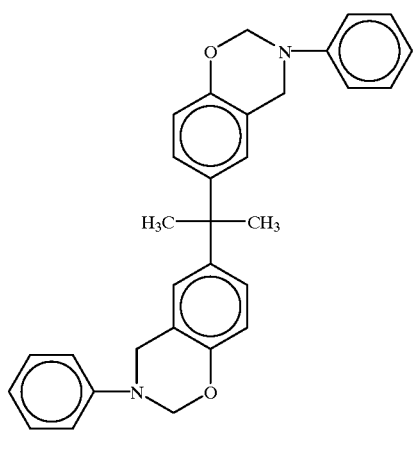

BA-a monomer

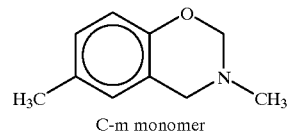

C-m monomer

BA-a monomer is made from the reaction of bisphenol A, formaldehyde, and aniline. C-m monomer is made from the reaction of cresol, formaldehyde and methylamine. C-m monomer was prepared according to the procedure set forth by Ning and Ishida in Journal of Polymer Science, Chemistry Edition, vol. 32, page 1121 (1994). The polymerization solvents used were 1,2-dichloroethane, 1,2-dichlorobenzene, chloroform, or deuterated chloroform. All the solvents were dried by conventional methods and distilled under argon. The cationic initiators used in Table 1 were purchased from Aldrich Chemical Company and used without further purification. All solvents and reactants were stored in a dry box unless refrigeration was required. The moisture was usually less than 1 ppm in the dry box. Table 1 below shows polymerizations, which were ran for about 20–80 hours using the specified variety of cationic and other initiators. Table 1 sets forth the results of polymerizations of BA-a monomer. While run numbers 8, 9, and 11 did not yield any insoluble polymer, the solutions turned deep red and a tough red polymer was recovered when the solvent was evaporated. The initiator amount was typically about 5 mole percent based upon the amount of benzoxazine monomer.

TABLE 1

| Run No. | Initiator | Temperature | CHCl₃ insoluble as wt. % based on total monomer weight |
|---|---|---|---|
| 1 | Phosphorus pentachloride (PCl₅) | 20 | 56.2 |
| 2 | Phosphorus trichloride (PCl₃) | 20 | 19.6 |
| 3 | Phosphorus oxychloride (POCl₃) | 20 | 15.0 |
| 4 | Titanium (V) chloride (TiCl₅) |  | 19.4 |
| 5 | Triphenylcarbenium antimonatehexachloride [(C₆H₅)₃ C⁺ (SbCl₆)⁻] | 20 | 8.7 |
| 6 | Antimony pentachloride (SbCl₅) | 53 | 10.1 |
| 7 | Antimony pentachloride/oxetane (Sb Cl₅) | 20 | 12.3 |
| 8 | Methyl tosylate (MeOTs) | — | — |
| 9 | Methyl triflate (MeOTf) | — | — |
| 10 | Aluminum phthalocyanine chloride (metallophorphyrin) | 20 | 20.4 |
| 11 | Triflic acid | — | — |
| 12 | Borontrifluoro dietherate | 53 | 0 |
| 13 | Borontrifluoro dietherate/promoter | 20 | 0 |
| 14 | p-tolyl triflate | 53 | 0 |
| 15 | Methyl iodide covalent initiator | 53 | 0 |
| 16 | Butyl lithium (anionic) | 20 | 0 |
| 17 | Benzoyl peroxide (free radical) | 110 | 0 |

TABLE 2

| Initiator | Tg by DSC (° C.) | char yield at 800° C. by TGA (%) |
|---|---|---|
| PCl₅ | 215 | 50.26 |
| PCl₃ | 216 | 48.93 |
| POCl₃ | 210 | 50.53 |
| TiCl₅ | 222 | 61.78 |
| Metallophorphyrin | 186 | 43.59 |
| MeOTf | 193 | 31.48 |
| MeOTs | 142 | 28.06 |
| Triflic Acid | — | 31.29 |
| (C₆H₅)₃C⁺(SbCl₆)⁻ | — | — |
| SbCl₅ | — | — |
| Thermal-cured (Cntrl) | 177 | 28.56 |

Several of the polymers polymerized according to the condition set forth in Table 1 were analyzed by thermogravimetric analysis (TGA) or differential scanning calorimity (DSC). The glass transition temperature (Tg) is used to characterize a particular polymer and microstructure. The char yield is affected by many factors, a high char yield is typically desired for precursors for char or for non-flammable polymers. As can be seen in Table 2 the first four cationic initiators yielded polymers from benzoxazine having significantly higher Tg's than the last sample which was a control (thermally cured) polybenzoxazine from the same monomer. The char yield from the polymers initiated with the first four cationic initiators varied from about 44 or 49 to about 62 weight percent based upon the weight of the initial starting polybenzoxazine. This was significantly higher than the control which yielded only about 29 weight percent char under identical conditions. The next three cationic initiators (5–7) yielded polymers with slightly different Tg's than the control. The char yield from the fifth through the seventh cationic initiator was also different than that of the control although the difference from the control amount was not as significant as with the first four cationic initiators, It is to be noted that the polymer from the methyl tosylate, methyl triflate, and triflic acid had a different color (red) than the polymers from the first four cationic initiators.

The polymers from the cationic polymerization of benzoxazine monomer BA-a were analyzed by Fourier transform infrared spectroscopy along with a thermally cured polybenzoxazine from the same monomer. These results indicated substantially similar infrared spectra when bisphenol A based benzoxazine was used. The polymers compared to the monomer showed the dramatic change in the peaks in the region of 1,000 to 1,350 cm⁻¹, arising from the $CH_2$ wagging (1327 cm⁻¹ and 1305 cm⁻¹), C—O—C asymmetric stretching (1233 cm⁻¹), C—N—C asymmetric stretching (1159 cm⁻¹), and C—O—C symmetric stretching (1031 cm⁻¹) of the oxazine ring, respectively, as well as the decrease of the peak resolution, indicate the opening of the oxazine ring and the polymerization of the monomer into oligomers and polymers.

There are significant spectral differences between the thermally polymerized polybenzoxazine and the PCl₅ initiated polybenzoxazines. In the spectrum of BA-a monomer the peaks centered at 1500 cm⁻¹ and 949 cm⁻¹ are major characteristics of the tri-substituted benzene ring in the benzoxazine structure, corresponding to the in-plane C—C stretching and the out-of-plane C—H deformation of tri-substituted benzene ring, respectively. These two peaks almost disappear in the thermally polymerized polybenzoxazine spectrum, meanwhile a new peak centered at 1489cm⁻¹, representing tetra-substituted benzene ring mode, appears. The results are in accordance with the well accepted thermal polybenzoxazine structure shown as below.

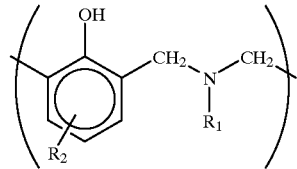

However, with some cationic initiators, here PCl₅ has been chosen as an example, these two peaks at 1500 cm⁻¹ and 949 cm⁻¹ remain unaffected except for the peak broadening, which indicates that in the polybenzoxazine structure obtained, the majority of the benzene rings should still be trisubstituted instead of tetrasubstituted. Further NMR results are in support of this hypothesis.

Polymers for size exclusion chromatographic (SEC) analysis were cationically polymerized from the BA-a monomer using chloroform as a solvent at about 23° C. using PCl₅ initiator and a mole ratio of 1:100 initiator:monomer. Portions of the reactants were withdrawn after 1, 2, 2.5, 3.5, 5, and 7 hours of reactions and poured into an excess of methylol to cause precipitation. The precipitated material was recovered and analyzed by SEC for differences in molecular weight as a function of reaction time. As is well known in SEC analysis, short retention times indicate higher molecular weight while long retention times indicate lower molecular weight. A peak at 29.3 minutes was associated with the benzoxazine monomer. A new peak occurred between 21 and 29 minutes as the polymerization occurred. Simultaneously the peak at 29.3 minutes decreased in size. This is consistent with theories on polymerization.

An NMR experiment was conducted comparing polymer from a cationic polymerization, using PCl₅ as the initiator in deuterated chloroform as a solvent, to a thermally polymerized polymer. The reaction temperature for the cationic polymerization was 40° C., the reactor was a sealed NMR tube, and the material was evaluated after 10 minutes, 30 minutes. I hour, and 2 hours to see which NMR peaks were being generated or depleted as the monomer was cationically polymerized. The monomer peaks at 2.6, 3.9, and 4.75 ppm gradually disappeared while new peaks at 1.95, and 3.65 ppm appeared and a broadening of the peak at 2.2 ppm occurred indicating less molecular rearrangement occurred on going from monomer to polymer under cationic conditions. Based on these results (proton NMR) along with carbon $^{13}$NMR and FTIR results the repeat structure of the thermally polymerized polymer in these studies is theorized to be predominantly tetrasubstituted phenolic structure, e.g.

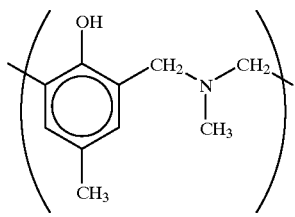

while the cationically polymerized samples is predominantly the phenoxy repeating units of the structure

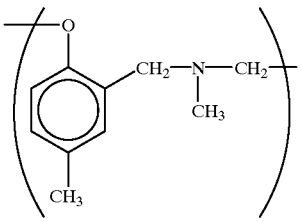

In conclusion the experimental data indicates the cationically initiated polymerization benzoxazine monomers can occur at substantially lower temperatures than thermal polymerization and produces polymers of different microstructure than thermal polymerizations. Further these polymers can have substantially higher char yields 62\29 or an increase of 200 percent over the char yield of the thermally polymerized polymers.

The polymers from benzoxazines are useful as precursors for char yielding material (e.g. precursors to aircraft brake pads). They are also useful as temperature and flame resistant polymers for electrical components, planes, cars, buses, etc.

While in accordance with the patent statutes the best mode and preferred embodiment has been set forth, the scope of the invention is not limited thereto, but rather by the scope of the attached claims.

What is claimed is:

1. A polymer derived from 2H-1,3-dihydrobenzoxazine monomers, comprising;
repeating units having the structure

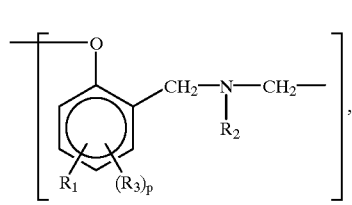

Structure I

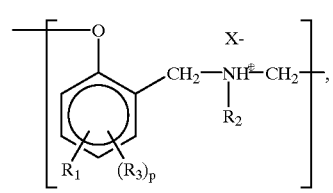

Structure Ib

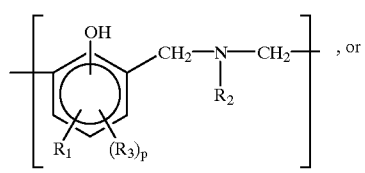

Structure II

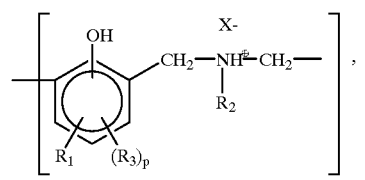

Structure IIb or combinations thereof
wherein if Structure II is present, the polymer must include at least 2, 5, 10, or 15 mole percent of repeating units of Structures I, Ib, or IIb,
wherein each $R_1$ is one or more groups selected from hydrogen, an alkyl of 1 to 80 carbon atoms, aromatic, alkyl substituted aromatic, or aromatic substituted alkyls having from 6 to 20 carbon atoms, mono or poly fluorine substituted alkyls of 1 to 20 carbon atoms, mono or poly substituted compounds having at least one aromatic ring and 6 to 20 carbon atoms, or phenolic compounds having from 6 to 20 carbon atoms and/or a connecting group forming a branch in said polymer,
$R_2$ is an alkyl of 1 to 40 carbon atoms, an aromatic substituted alkyl or alkyl substituted aromatic of 6 to 40 carbon atoms, mono or poly fluorine substituted alkyl of 1 to 20 carbon atoms, a mono or poly fluorine substituted compound with at least one aromatic ring and 6 to 20 carbon atoms, an amine of 1 to 40 carbon atoms including optionally polyamines and aromatic, alkyl substituted aromatic or aromatic substituted alkyl amines of 6 to 40 carbon atoms or a connecting group selected from the $R_2$ groups connected to another polymer from benzoxazine monomers, and
wherein $R_3$ is H or $R_2$ and
X is a counterion such as a halogen and p is an integer from 0 to 3.

2. A polymer according to claim 1, wherein said polymers are derived from the ring opening polymerization of one or more 2H-1,3,-dihydrobenzoxazine monomers.

3. A polymer according to claim 2, wherein said one or more 2H-1,3,-dihydrobenzoxazine monomers include at least 25 mole % of one or more monomers having the formula

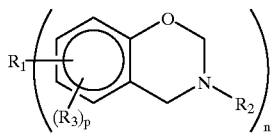

Formula A wherein each $R_1$ individually is one or more groups selected from hydrogen, alkyls of 1 to 10 carbon atoms, aromatic, alkyl substituted aromatic, or aromatic substituted alkyl of 6 to 20 carbon atoms, mono or poly fluorine substituted alkyls of 1 to 20 carbon atoms, mono or poly fluorine substituted compounds having at least one aromatic ring and 6 to 20 carbon atoms or a benzoxazine from a phenolic compound of 6 to 20, n is from 1 to 4, wherein each $R_2$ is an alkyl of 1 to 10 carbon atoms, an aromatic, alkyl substituted aromatic or aromatic substituted alkyl of 6 to 20 carbon atoms, or an amine of 1 to 10 carbon atoms, or a benzoxazine of 9 to 20 carbon atoms, and wherein $R_3$ and p are as defined above.

4. A polymer according to claim 3, wherein said $R_1$ group of said formula A is ortho to the oxygen of the benzoxazine.

5. A polymer according to claim 3, wherein said $R_1$ group of said Formula A is meta to the oxygen and para to the $CH_2$—N—$(R_2)$.

6. A polymer according to claim 3, wherein said $R_1$ group of formula A is para to said oxygen.

7. A polymer according to claim 1 having a number average molecular weight of at least 5,000.

8. A polymer, comprising;
   the reaction product of reacting at least one 2H-1,3,-dihydrobenzoxazine monomer with a cationic polymerization initiator.

9. A polymer according to claim 8, wherein the cationic polymerization initiator comprises $PCl_5$, $PCl_3$, $POCl_3$, $TiCl_5$, $(C_6H_5)_3$ $C^+$ $(SbCl_6)^-$, $SbCl_5$, methyl triflate, methyl tosylate, triflic acid, or aluminum phthalocyanine chloride or combinations thereof.

10. A polymer according to claim 8, wherein said at least one 2H-1,3,-dihydrobenzoxazine monomer comprises at least 25 mole percent of one or more monomers having the formula

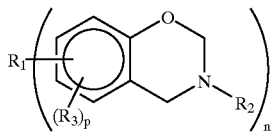

Formula A wherein $R_1$ individually is hydrogen, one or more groups selected from alkyls of 1 to 10 carbon atoms, an aromatic, alkyl substituted aromatics, or aromatic substituted alkyls of 6 to 20 carbon atoms, mono or poly fluorine substituted alkyls of 1 to 20 carbon atoms, mono or poly fluorine substituted compounds having at least one aromatic ring and 6 to 20 carbon atoms, or a benzoxazine from a phenolic compound of 6 to 20, n is from 1 to 4, wherein each $R_2$ is an alkyl of 1 to 10 carbon atoms, an aromatic, alkyl substituted aromatic or aromatic substituted alkyl of 6 to 20 carbon atoms or an amine of 1 to 10 carbon atoms or a benzoxazine of 9 to 20 carbon atoms and wherein $R_3$ is H or $R_2$ and p is an integer between 0 and 3.

11. A polymer according to claim 2, wherein said polymer is a moldable thermoplastic.

12. A polymer according to claim 2, wherein said polymer is a crosslinked thermoset polymer.

13. A polymer according to claim 12, wherein the reaction occurs in the presence of at least one solvent for said at least one 2H-1,3,-dihydrobenzoxazine monomer or in the melt.

14. A process for forming a polymer from a 2H-1,3,-dihydrobenzoxazine monomer comprising,
   reacting a cationic polymerization initiator with 2H-1,3,-dihydrobenzoxazine monomers at a temperature from about –100° C. to about 200° C.

15. A process according to claim 14, wherein the cationic polymerization initiator comprises $PCl_5$, $PCl_3$, $POCl_3$, $TiCl_5$, $(C_6H_5)_3$ $C^+$ $(SbCl_6)^-$, $SbCl_5$, methyl triflate, methyl tosylate, triflic acid, or aluminum phthalocyanine chloride or combinations thereof.

16. A process according to claim 14, wherein the 2H-1,3,-dihydrobenzoxazine monomers forming said polymer comprise at least 25 mole percent of one or more monomers of the formula

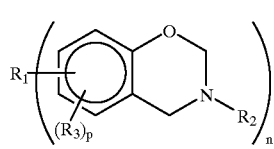

Formula A wherein $R_1$ individually is hydrogen, one or more groups selected from alkyls of 1 to 10 carbon atoms, an aromatic, alkyl substituted aromatics, or aromatic substituted alkyls of 6 to 20 carbon atoms, aromatic ring and 6 to 20 carbon atoms mono or poly fluorine substituted alkyls of 1 to 20 carbon atoms, mono or poly fluorine substituted compound having at least one or a benzoxazine from a phenolic compound of 6 to 20, n is from 1 to 4, wherein each $R_2$ is an alkyl of 1 to 10 carbon atoms, an aromatic, alkyl substituted aromatic, or aromatic substituted alkyl of 6 to 20 carbon atoms, or an amine of 1 to 1 0 carbon atoms, or a benzoxazine of 9 to 20 carbon atoms and wherein $R_3$ is H or $R_2$ and p is an integer from 0 to 3.

17. A polymer according to claim 1, wherein at least 20 mole % of the repeat units of the polymer arc of structure I.

18. A polymer according to claim 2, wherein at least 50 mole % of the repeat units of the polymer are of structure I.

19. A polymer according to claim 1, wherein at least 75 mole % of the repeat units are of structure I.

20. A polymer from 2H-1,3,-dihydrobenzoxazine monomers, comprising repeating units having the structure Structure I

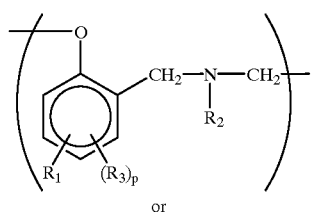

or

Structure III

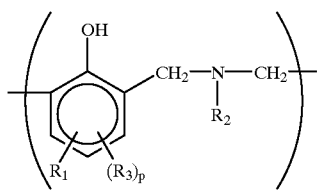

or combinations thereof, said polymer having a number average molecular weight above 2,000,
wherein each $R_1$ is 1) one or more groups selected from hydrogen, an alkyl of 1 to 80 carbon atoms, aromatic, alkyl substituted aromatic, or aromatic substituted alkyls having from 6 to 20 carbon atoms, mono or poly fluorine substituted alkyls of 1 to 20 carbon atoms, mono or poly substituted compounds having at least one aromatic ring and 6 to 20 carbon atoms, or phenolic compounds having from 6 to 20 carbon atoms and/or a connecting group forming a branch in said polymer and $R_2$ is an alkyl of 1 to 40 carbon atoms, an aromatic substituted alkyl or alkyl substituted aromatic of 6 to 40 carbon atoms, mono or poly fluorine substituted alkyl of 1 to 20 carbon atoms, a mono or poly fluorine substituted compound with at least one aromatic ring and 6 to 20 carbon atoms, an amine of 1 to 40 carbon atoms including optionally polyamines and aromatic, alkyl substituted aromatic or aromatic substituted alkyl amines of 6 to 40 carbon atoms or a connecting group selected from the $R_2$ groups connected to another polymer from benzoxazine monomers, and wherein $R_3$ is H or $R_2$ and p is an integer from 0 to 3.

* * * * *